United States Patent [19]

Hamada et al.

[11] Patent Number: 5,160,670
[45] Date of Patent: Nov. 3, 1992

[54] METHOD OF MANUFACTURING SILICONE RUBBER MOLDINGS

[75] Inventors: Mitsuo Hamada; Atsushi Sakuma; Koji Shimizu, all of Chiba, Japan

[73] Assignee: Dow Corning Toray Silicone Co., Ltd., Tokyo, Japan

[21] Appl. No.: 719,421

[22] Filed: Jun. 24, 1991

[30] Foreign Application Priority Data

Jun. 25, 1990 [JP] Japan ................ 2-164221

[51] Int. Cl.$^5$ .................................. C08K 3/34
[52] U.S. Cl. ............................ 264/6; 264/13; 264/115; 264/143; 264/236; 264/331.11; 428/405; 428/407; 528/15; 528/24
[58] Field of Search ............ 264/6, 13, 115, 130, 264/140, 143, 236, 331.12, 331.11; 428/405, 407, 143, 144, 145, 206, 220, 331, 327, 447; 528/15, 24

[56] References Cited

U.S. PATENT DOCUMENTS

| | | | |
|---|---|---|---|
| 3,843,601 | 10/1974 | Bruner | 260/46.5 G |
| 4,528,156 | 7/1985 | Fukuda et al. | 264/236 |
| 4,728,687 | 3/1988 | Watanabe et al. | 524/493 |
| 4,742,142 | 5/1988 | Shimizu et al. | 528/15 |
| 4,743,670 | 5/1988 | Yoshido et al. | 528/15 |
| 4,749,765 | 6/1988 | Shimizu et al. | 528/15 |
| 4,783,289 | 11/1988 | Shimizu et al. | 264/28 |
| 4,824,616 | 4/1989 | Shimizu et al. | 264/7 |
| 4,911,974 | 3/1990 | Shimizu et al. | 428/143 |
| 4,985,277 | 1/1991 | Shimizu et al. | 427/180 |

FOREIGN PATENT DOCUMENTS 55-133451 10/1980 Japan.

Primary Examiner—Mary Lynn Theisen
Attorney, Agent, or Firm—Edward C. Elliott

[57] ABSTRACT

A method for the manufacture of silicone rubber moldings comprises the preparation of a silicone rubber composition by blending an organoperoxide having an activation energy of 25 to 41 kcal/mol into a semicurable organopolysiloxane composition whose main component is organopolysiloxane having organoperoxide-crosslinkable functional groups. The silicone rubber composition is made into a particulate form and heated at a temperature below 100 degrees Centigrade to produce a semicured, particulate molding material which retains the activity of the organoperoxide and which contains residual crosslinkable functional group on the organopolysiloxane. Subsequently a mold is filled with the molding material and the mold material is completely cured at a temperature of at least 100 degrees Centigrade under the application of pressure. The method is particularly useful for automatic molding methods.

12 Claims, No Drawings

METHOD OF MANUFACTURING SILICONE RUBBER MOLDINGS

BACKGROUND OF THE INVENTION

1. Field of the Invention

The present invention relates to a highly productive method for the manufacture of silicone rubber moldings which supports automation of the molding process. The present invention further relates to a molding material for use in the aforesaid manufacturing process.

2. Background Information

Compression molding is already known as a method for the production of silicone rubber moldings. In compression molding, the silicone rubber stock is suitably cut in a preliminary manual operation into an easy-to-handle form which is adapted to the size and configuration of the mold. This is then placed within the mold and heat and pressure are applied. However, considering the process of placement in the mold, not only must positioning be performed each time, but this positioning becomes difficult when the mold has a complicated structure and configuration. This precludes molding automation, and improvements in productivity cannot be expected.

The silicone rubber powder used as an ingredient in the method of this invention is disclosed in U.S. Pat. Nos. 4,742,142; 4,743,670; and 4,749,765. The powder and its methods of manufacture are fully explained in these patents.

SUMMARY OF THE INVENTION

An organopolysiloxane having organoperoxide-crosslinkable functional groups is blended with an organoperoxide having an activation energy of 25 to 41 kcal/mol, formed into particulate form at a temperature below 100° C. and then semicured. These particles are then used to fill a mold and are cured under pressure at a temperature of greater than 100° C.

The present invention takes as its object the introduction of a method for the manufacture of silicone rubber moldings, wherein said method facilitates and supports automation of the molding process regardless of the configuration and structure of the mold. A further object of the present invention is the introduction of a molding material for the manufacture of silicone rubber moldings which makes possible the implementation of the aforesaid production method.

According to the present invention's method for the manufacture of silicone rubber moldings, a silicone rubber composition is prepared by the addition of an organoperoxide with an activation energy of 25 to 41 kcal/mol to a semicurable organopolysiloxane composition whose main component is organopolysiloxane which contains organoperoxide-crosslinkable function groups. This silicone rubber composition is cured into a particulate form at a temperature below 100 degrees Centigrade in order to manufacture a semicured, particulate molding material, which is then filled into a mold and cured at temperatures of at least 100 degrees Centigrade with the application of pressure. As a consequence, within the sphere of cavity-based molding processes, said molding material can be completely and seamlessly filled into the mold through a simple introduction into or pouring into the mold, which makes possible and supports molding automation.

Moreover, because this molding material is a particulate, it may be compactly filled into the mold, and it is then easily unified into a single body or element when cured by heating to at least 100 degrees Centigrade under the application of pressure. At the same time, the organoperoxide is activated, and a complete cure is achieved by crosslinking among the residual crosslinkable functional groups still present on the organopolysiloxane. Moreover, the obtained silicone rubber molding is highly releaseable from the mold and can therefore be easily demolded.

DESCRIPTION OF THE INVENTION

This invention relates to a method for the manufacture of silicone rubber moldings comprising (A) preparation of a silicone rubber composition by blending organoperoxide having an activation energy of 25 to 41 kcal/mol into a semicurable organopolysiloxane composition whose main component is organopolysiloxane having organoperoxide-crosslinkable functional groups; (B) curing the aforesaid silicone rubber composition into a particulate form at a temperature below 100 degrees Centigrade to produce a semicured, particulate molding material which retains the activity of the aforesaid organoperoxide and which contains residual crosslinkable functional group on the aforesaid organopolysiloxane; and (C) subsequently filling the aforesaid molding material into a mold and completely curing at a temperature of at least 100 degrees Centigrade under the application of pressure.

Within the context of the present invention, "semicured" refers to a silicone rubber composition which has undergone crosslinking to give the partial formation of a three-dimensional network structure: a cure state is achieved in which fluidity is no longer exhibited under normal conditions of quiescence while deformation or a limited fluidity is exhibited under the application of pressure. Furthermore, the cured material in this cure state retains residual crosslinkable functional groups on the organopolysiloxane, and it can be converted into a rubbery elastic silicone rubber by further reaction to develop the complete cure. Finally, the semicured material has a hardness not exceeding 50° when measured by an Asker C hardness meter from Kobunshi Keiki Kabushiki Kaisha and a hardness not exceeding zero when measured according to a JIS A hardness meter.

Within the context of the present invention, the activation energy of the organoperoxide denotes the $\Delta E$ in the following formula.

$k = A \exp [\Delta E/RT]$
$k$ = decomposition rate constant
$A$ = frequency factor
$R$ = gas constant
$T$ = temperature (K)

The desired silicone rubber moldings can be prepared in a highly efficient manner by the execution of a two-stage cure on the silicone rubber composition prepared by the admixture of organoperoxide into such a semicurable organopolysiloxane composition. The first-stage cure is executed to afford a semicured, particulate molding material which retains the activity of the organoperoxide and which still contains residual organoperoxide-crosslinkable functional groups on the organopolysiloxane. Since this molding material is a particulate, it can be automatically filled into the mold interior in a crevice-free or seamless manner by simply pouring or projecting it into the mold. Molding automation becomes possible because it is entirely unnecessary to perform such operations as positioning, etc.

The present invention's method for manufacturing silicone rubber moldings will be explained in detail in the following. First, the semicurable organopolysiloxane composition used by the present invention comprises a composition which can be cured to yield a semicured organopolysiloxane material. Any of the following may be employed as this composition: addition reaction-curing semicurable organopolysiloxane compositions, organoperoxide-based radical reaction-curing semicurable organopolysiloxane compositions, and condensation reaction-curing semicurable organopolysiloxane compositions. Among these, addition reaction-curing semicurable organopolysiloxane compositions based on the following components A, B, and C are preferred due to the excellent uniformity of their cure. A is an organopolysiloxane having at least 2 lower alkenyl groups in each molecule. B is an organohydrogenpolysiloxane having at least 2 silicon-bonded hydrogen atoms in each molecule. C is a platinum-type catalyst.

First, the component A is the principal or base component of the addition reaction-curing semicurable silicone rubber composition, and this component A is exemplified as follows: dimethylvinylsiloxy-terminated methylvinylpolysiloxanes, dimethylvinylsiloxy-terminated methylvinylsiloxane-dimethylsiloxane copolymers, dimethylvinylsiloxy-terminated dimethylsiloxane-methylphenylsiloxane copolymers, dimethylvinylsiloxy-terminated dimethylsiloxane-diphenylsiloxane-methylvinylsiloxane copolymers, trimethylsiloxy-terminated dimethylsiloxane-methylvinylsiloxane copolymers, trimethylsiloxy-terminated dimethylsiloxane-methylphenylsiloxane-methylvinylsiloxane copolymers, dimethylvinylsiloxy-terminated methyl(3,3,3-trifluoropropyl)polysiloxanes, dimethylvinylsiloxy-terminated dimethylsiloxane-methyl(3,3,3-trifluoropropyl)siloxane copolymers, and polysiloxanes composed of $CH_2=CH(CH_3)_2SiO_{\frac{1}{2}}$ units, $(CH_3)_2SiO_{2/2}$ units, and $SiO_{4/2}$ units.

Component A preferably has a viscosity (at 25 degrees Centigrade) of at least 100 centipoise to 100,000 centipoise. Component B is a crosslinker for component A, and curing proceeds by an addition reaction, mediated by the platinum-type catalyst comprising component C, between the silicon-bonded hydrogen atoms in this component B and the lower alkenyl groups (vinyl, allyl, propenyl, etc.) in component A.

Component B is exemplified by trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, dimethylsiloxane-methylhydrogensiloxane cyclic copolymers, copolymers composed of $(CH_3)_2HSiO_{\frac{1}{2}}$ units and $SiO_{4/2}$ units, and copolymers composed of $(CH_3)_3SiO_{\frac{1}{2}}$ units, $(CH_3)_2HSiO_{\frac{1}{2}}$ units, and $SiO_{4/2}$ units.

Component B should have a viscosity at 25 degrees Centigrade of 1 to 50,000 centipoise.

Component B is preferably added in quantities which provide values of (0.1:1) to (1:1) for the molar ratio between the total quantity of silicon-bonded hydrogen atoms in component B and the total quantity of all lower alkenyl groups in component A. When this ratio falls below (0.1:1), the crosslink density becomes too low and the cure will be unsatisfactory. Values for this ratio in excess of (1:1) make it very difficult to obtain a semicure.

The platinum-type catalyst comprising component C is a catalyst which induces and accelerates the addition reaction between the lower alkenyl groups in component A and the silicon-bonded hydrogen atoms in component B. This component C is exemplified by platinum, platinum supported on a carrier, chloroplatinic acid, chloroplatinic acid dissolved in alcohol or ketone, and complexes between chloroplatinic acid and olefin, alkenylsiloxane, or diketone.

Component C should be added at 0.1 to 1,000 weight parts and preferably at 1 to 100 weight parts, in each case as platinum metal based on 1,000,000 weight parts of the total quantity of components A plus B. Quantities in excess of 1,000 weight parts are uneconomical.

Organoperoxide is mixed as a cure accelerator into the above described semicurable organopolysiloxane composition, and this compound should have an activation energy of 25 to 41 kcal/mol. The use of organoperoxide with an activation energy less than 25 kcal/mol strongly impairs the ability to achieve a complete cure during execution of the second-stage, secondary inmold cure on molding material obtained by the first-stage semicure of a silicone rubber composition containing such an organoperoxide. This precludes the thorough cure necessary to give a rubbery elastic silicone rubber molding. The physical properties of the silicone rubber molding are impaired at values in excess of 41 kcal/mol.

The organoperoxide constituent of the silicone rubber composition according to the present invention is exemplified by the organoperoxides listed below (activation energy for each compound reported in parentheses).

isobutyryl peroxide (26.5),
tert-butylperoxy neodecanoate (27.7),
tert-hexylperoxy neohexanoate (26.5),
tert-butylperoxy neohexanoate (28.1),
2,4-dichlorobenzoyl peroxide (25.4),
3,5,5-trimethylhexanoyl peroxide (30.4),
octanoyl peroxide (29.7),
decanoyl peroxide (30.0),
cumylperoxy octoate (31.3),
tert-butylperoxy 2-ethylhexanoate (29.2),
benzoyl peroxide (31.1),
tert-butylperoxy isobutyrate (31.5),
1,1-bis(tert-butylperoxy)-3,3,5-trimethylcyclohexane (33.2), 1,1-bis(tert-butylperoxy)cyclohexane (31.4),
tert-butylperoxy laurate (28.5),
tert-butylperoxy 3,5,5-trimethylhexanoate (30.3),
2,5-dimethyl-2,5-di(benzoylperoxy)hexane (35.5),
2,2-bis(tert-butylperoxy)octane (35.2),
2,2-bis(tert-butylperoxy)butane (36.2),
tert-butylperoxy benzoate (35.5),
dicumyl peroxide (40.6),
2,5-dimethyl-2,5-di(tert-butylperoxy)hexane (36.3),
tert-butyl cumyl peroxide (38.2),
diisopropylbenzene hydroperoxide (30.4),
di-tert-butyl peroxide (37.3),
2,5-dimethyl-2,5-di(tert-butylperoxy)hexane (36.7), and
tert-butyl hydroperoxide (31.4).

Among these, the use of the organoperoxides listed below (decomposition temperature at least 50 degrees Centigrade) is preferred in order to obtain a half-life of 10 hours. The decomposition temperature in degrees Centigrade is reported in parentheses for each of the compounds listed below. The half-life value as referenced above expresses the organoperoxide decomposition rate at a constant temperature, and it is the time required during decomposition of the original organoperoxide for its quantity of active oxygen to fall to one-half. 2,4-dichlorobenzoyl peroxide (53 degrees centigrades), 1,1-bis(tert-butylperoxy)-3,3,5-trimethylcyclohexane (90 degrees Centigrade), 1,1-bis(tert-butylperoxy)cyclohexane (91 degrees Centigrade), di-tert-butyl peroxide (124 degrees Centigrade), tert-butyl cumyl peroxide (120 degrees Centigrade), dicumyl peroxide (117 degrees Centigrade), 2,5-dimethyl-2,5-di(-tert-butylperoxy)hexane (118 degrees Centigrade), and 2,5-dimethyl-2,5-di(tert-butylperoxy)hex-3-yne (135 degrees Centigrade).

The aforesaid organoperoxide should be added within the range of 0.1 to 10 weight parts per 100 weight parts of the total quantity of the aforesaid components A plus B.

This organoperoxide should be dispersed to homogeneity into the semicurable organopolysiloxane composition to the maximum extent possible. The organoperoxide should be mixed into the semicurable organopolysiloxane composition while maintaining the temperature below 100 degrees Centigrade, and preferably while maintaining the temperature at $-60$ degrees Centigrade to $+10$ degrees Centigrade, in order thus to avoid a loss in its activity. Mixing should be carried out using a stirrer/mixer, for example, a static mixer.

As necessary, the semicurable organopolysiloxane composition as described hereinbefore may contain various types of fillers in order to adjust the fluidity of the composition or improve the mechanical strength of the silicone rubber molding. These fillers are exemplified by reinforcing fillers such as precipitated silica, fumed silica, fumed titanium oxide, and calcined silica, etc.; non-reinforcing fillers such as powdered quartz, diatomaceous earth, asbestos, aluminosilicic acid, iron oxide, zinc oxide, calcium carbonate, etc.; and the preceding after surface treatment with an organosilicon compound such as hexamethyldisilazane, trimethylchlorosilane, or polymethylsiloxane.

Moreover, very small amounts of the following additives can be added in order to inhibit the curing reaction: acetylenic compounds, hydrazines, triazoles, phosphines, and mercaptans.

The resulting silicone rubber composition, prepared as described above by the addition of organoperoxide to a semicurable organopolysiloxane composition, is first cured into a particulate form at temperatures below 100 degrees Centigrade prior to its conversion into the completely mold-cured, rubbery elastic silicone rubber molding. A number of methods are available for execution of the former. To give one example thereof, the aforesaid silicone rubber composition may be cured into the semicured state by passing it through the small orifice of, for example, an extrusion nozzle, and dripping it into or pouring it down into a curing fluid which resides at below 100 degrees Centigrade, where it is dispersed to give a spherical morphology. The product is the intermediate molding material (semicured particulate). It is essential that the temperature of this curing fluid be held below 100 degrees Centigrade: the maintenance of this temperature condition makes possible the primary cure, without activation of the organoperoxide, to a semicured state in which residual functional groups are still present on the organopolysiloxane.

As another example, the silicone rubber composition, of organoperoxide plus semicurable organopolysiloxane composition, can be extruded from an extrusion nozzle in strand form into a curing fluid. This is cured as such, and the semicured strand is then cut, for example, with a cutter, to give a granulated molding material of arbitrary dimensions.

The curing fluid responsible for curing the silicone rubber composition may take the form of various thermal media as typified by water, liquid paraffin, waxes, dimethylsilicone oil, phthalate esters, and so forth. Water is preferred among these for its high heat capacity, ease of handling, and low cost. In order to accelerate curing, the curing fluid should have a temperature of at least 25 degrees Centigrade, but preferably is used heated to at least 50 degrees Centigrade but below 100 degrees Centigrade.

The semicured, particulate molding material thus obtained will typically evidence surface tack. As a consequence, it should be dusted with, for example, silicone rubber powder, prior to the subsequent molding step in order to eliminate the surface tack and avoid the formation of lumps. This silicone rubber powder is preferably silicone rubber micropowder obtained by curing a silicone rubber composition emulsified in water. The powder and method of manufacture is described in U.S. Pat. No. 4,742,142, issued May 3, 1988, which patent is incorporated by reference to show the micropowder and its method of manufacture.

This semicured, particulate molding material can then be molded according to typical compression molding techniques. In other words, this molding material is filled into a mold and heated at least to 100 degrees Centigrade under the application of pressure. This thermal molding step causes the organoperoxide to decompose and become active and thus induce the reaction of the residual functional groups on the organopolysiloxane. This leads to completion of the cure and the development of the chemically and physically stable silicone rubber molding. Furthermore, the molded article can be easily demolded because it has an excellent mold releaseability after completion of the cure.

This molding material is stable when maintained at temperatures below 100 degrees Centigrade because the organoperoxide contained in it is not decomposed or activated, and it can therefore be stored for long periods of time.

The following examples are included for illustrative purposes only and should not be construed as limiting the invention which is properly set forth in the appended claims. All parts are parts by weight. Unless stated otherwise, measurements are made at 25° C.

EXAMPLE 1

The following were combined and mixed to afford a liquid mixture A: 30 parts dimethylvinylsiloxy-terminated dimethylpolysiloxane (vinyl group content=0.25 weight %) with a viscosity of 2,000 centipoise, 70 parts dimethylvinylsiloxy-terminated dimethylpolysiloxane (vinyl group content=0.5 weight %) with a viscosity of 500 centipoise, and 1.5 parts trimethylsiloxy-terminated methylhydrogenpolysiloxane (silicon-bonded hydrogen content=0.8 weight %) with a viscosity of 5 centipoise.

The following were then combined and mixed to afford a liquid mixture B: 30 parts of the dimethylpolysiloxane with viscosity=2,000 centipoise as used for liquid mixture A, 70 parts of the dimethylpolysiloxane with viscosity=500 centipoise as above, 0.4 parts isopropanolic chloroplatinic acid solution (platinum content=3 weight %), and, as the organoperoxide, 1.0 parts 2,5-dimethyl-2,5-di(tert-butylperoxy)hexane (activation energy=36.3 kcal/mol).

Mixtures A and B (preliminarily cooled to −10 degrees Centigrade) were introduced using a gear pump into a static mixer and were mixed at a 1:1 ratio. This liquid mixture was passed through a small orifice and immediately poured down onto the surface of hot water (85 degrees Centigrade). This poured composition, which fragmented or particulated in the vicinity of the surface of the hot water, was dispersed in the hot water and semicured. The semicured product was removed 3 minutes after introduction. The obtained semicured product was a spherical particulate with an average particle diameter of 1 mm. This spherical particulate had a hardness of 10° when measured by an Asker C hardness meter and a hardness of zero when measured by a JIS A hardness meter. This semicured, particulate molding material was dried in an oven at 80 degrees Centigrade for 10 hours, and was then dusted with a silicone rubber powder having an average particle diameter of 0.5 micrometers (Torayfil E601, from Toray Dow Corning Silicone Company, Limited). The resulting nontacky molding material was filled into a press mold (cavity diameter=30 mm, cavity depth=10 mm) to a 10% excess over the mold volume. Molding was carried out by hot pressing for 5 minutes at 170 degrees Centigrade under the application of 200 kg/cm2 (gage pressure). The obtained silicone rubber molding had a diameter of 29.25 mm and a thickness of 9.75 mm, corresponding to a molding shrinkage of 2.5%, and therefore was an excellent reproduction of the dimensions of the mold.

Moreover, the mold releaseability was excellent, which obviated the necessity for employing a fluorine-type release agent or soap release agent as has been typically used heretofore.

EXAMPLE 2

A liquid mixture A was prepared by mixing 100 Parts dimethylvinylsiloxy-terminated dimethylpolysiloxane with a viscosity of 500 centipoise (vinyl group content=0.5 weight %) with 40 parts carbon black (Denka Black from Denki Kagaku Kabushiki Kaisha), followed by the further addition with mixing of 1.5 parts trimethylsiloxy-terminated methylhydrogenpolysiloxane with a viscosity of 5 centipoise (silicon-bonded hydrogen content=0.8 weight %).

Next, a liquid mixture B was prepared by mixing 100 parts dimethylpolysiloxane with a viscosity of 500 centipoise as above with 40 parts carbon black (Denka Black from Denki Kagaku Kabushiki Kaisha), then by the further addition with mixing of 0.4 parts isopropanolic chloroplatinic acid solution (platinum content=3 weight %) and 1.0 parts organoperoxide with an activation energy of 25.4 kcal/mol (Perhexane 25B from Nippon Yushi Kabushiki Kaisha).

Mixtures A and B (preliminarily cooled to −10 degrees Centigrade) were introduced, using a gear pump, into a static mixer and were mixed at a 1:1 ratio. This liquid mixture was extruded into a fibrous form by passage through a nozzle (hole diameter=2 mm) into hot water (85 degrees Centigrade). The obtained semicured strand had a hardness of 25° when measured with an Asker C hardness meter. After this strand had been immersed for 10 seconds in hot water (80 degrees Centigrade), it was cut to 3 mm long pieces using a cutter and dusted with the same silicone powder as described in Example 1 to afford a nontacky, semicured, particulate molding material. This molding material was preliminarily passed through a screen and directed into a mold designed for the molding of pressure-sensitive electrically conductive rubber sheet (the mold cavity produced 5 sheets with a size of 5 mm×20 mm×0.5 mm). No residue was found on the screen, and the molding material could be automatically filled into this cavity in a highly efficient manner. This mold was then hot-pressed for 5 minutes at 170 degrees Centigrade under a pressure of 200 kg/cm2. Demolding afforded a molded sheet which had a conductivity of 10 ohm-cm and which essentially reproduced the cavity dimensions intact. Moreover, the molded sheet was very easily released from the mold.

EXAMPLE 3

The nonconductive semicured particulate from Example 1 (1 mm diameter) and the conductive semicured particulate (3 mm long) from Example 2 were mixed to homogeneity to give two mixtures, one in which their mixing ratio (nonconductive semicured particulate of Example 1: conductive semicured particulate of Example 2) was 70:30 and one in which their mixing ratio was 80:20. Each mixture was filled into a frame mold (150 mm×220 mm×3 mm) to a 20% volume excess, and a sheet-form plate was obtained by molding for a cure time of 5 minutes at a press temperature of 150 degrees Centigrade and a press pressure of 200 kg/cm$^2$ (gage). Each sheet was measured for its volume resistivity with the following results: $2\times10^7$ ohm-cm for the 70:30 mixture, $3\times10^8$ ohm-cm for the 80:20 mixture; both were semiconductive. This molding procedure was repeated and the volume resistivity was also again measured as above. The first plate at the 70:30 mixing ratio had a value of $4\times10^7$ ohm-cm, while the second plate at the 70:30 mixing ratio had a value of $1\times10^8$, in each case confirming an excellent reproducibility.

That which is claimed is:

1. Method for the manufacture of silicone rubber moldings comprising
   (A) preparing a silicone rubber composition by blending organoperoxide having an activation energy of 25 to 41 kcal/mol into a semicurable organopolysiloxane composition whose main component is organopolysiloxane having organoperoxide-crosslinkable functional groups;
   (B) curing the aforesaid silicone rubber composition into a particulate form at a temperature below 100 degrees Centigrade to produce a semicured, particulate molding material which retains the activity of the aforesaid organoperoxide and which contains residual crosslinkable functional group on the aforesaid organopolysiloxane; and
   (C) subsequently filling the aforesaid molding material into a mold and completely curing at a temperature of at least 100 degrees Centigrade under the application of pressure.

2. The method of claim 1 in which the semicured, particulate molding material of step (B) is coated with silicone rubber powder before step (C).

3. The method of claim 1 in which the particulate molding material of step (B) is formed by extruding the silicone rubber composition of step (A) through a small orifice and into a curing fluid in the form of drops, the curing fluid being at a temperature of at least 50° C. and below 100° C.

4. The method of claim 3 in which the curing fluid is water.

5. The method of claim 1 in which the particulate molding material of step (B) is formed by extruding the silicone rubber composition of step (A) through a small orifice to form a strand and into a curing fluid at a temperature of at least 50° C. and below 100° C., then cutting the semicured strand into short lengths to form particles.

6. The method of claim 5 in which the curing fluid is water.

7. Semicured, particulate molding material for the manufacture of silicone rubber moldings, containing organoperoxide having an activation energy of 25 to 41 kcal/mol, containing residual functional groups from organopolysiloxane having organoperoxide-crosslinkable functional groups, and being coated with silicone rubber powder.

8. The molding material of claim 7 wherein the organopolysiloxane is an addition reaction-curing semicurable organopolysiloxane composition comprising (A) an organopolysiloxane having at least 2 lower alkenyl groups per molecule, (B) an organohydrogenpolysiloxane having at least 2 silicone-bonded hydrogen atoms per molecule, and (C) a platinum catalyst.

9. The molding material of claim 8 wherein (A) has a viscosity of from 100 to 100,000 centipoises at 25° C.

10. The molding material of claim 8 wherein (B) has a viscosity of from 1 to 50,000 centipoises at 25° C.

11. The molding material of claim 8 wherein the ratio of (A) to (B) is chosen so that the ratio of silicon-bonded hydrogen atoms in (B) to the lower alkenyl groups in (A) is from 0.0:1 to 1:1.

12. The molding material of claim 7 wherein there is present from 0.1 to 10 parts by weight of organoperoxide per 100 parts by weight of (A) plus (B).

* * * * *